(12) United States Patent
Lin

(10) Patent No.: US 12,363,700 B2
(45) Date of Patent: Jul. 15, 2025

(54) SYSTEMS AND METHODS FOR COMMUNICATIONS IN NON-TERRESTRIAL NETWORKS

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 465 days.

(21) Appl. No.: 17/959,379

(22) Filed: Oct. 4, 2022

(65) Prior Publication Data

US 2023/0021700 A1     Jan. 26, 2023

Related U.S. Application Data

(63) Continuation of application No. PCT/IB2020/000483, filed on Apr. 8, 2020.

(51) Int. Cl.
*H04W 72/1263* (2023.01)
*H04L 1/1812* (2023.01)
*H04W 84/06* (2009.01)

(52) U.S. Cl.
CPC ....... *H04W 72/1263* (2013.01); *H04L 1/1812* (2013.01); *H04W 84/06* (2013.01)

(58) Field of Classification Search
CPC . H04B 7/18532; H04L 5/0091; H04L 1/1812; H04L 5/0025; H04W 72/1263
See application file for complete search history.

(56) References Cited

U.S. PATENT DOCUMENTS

| | | |
|---|---|---|
| 2017/0325216 A1 | 11/2017 | Nogami et al. |
| 2018/0375625 A1* | 12/2018 | Luo ............... H04L 5/0051 |
| 2019/0052322 A1 | 2/2019 | Akkarakaran et al. |
| 2019/0082408 A1* | 3/2019 | Kim ............... H04W 72/0453 |
| 2019/0174466 A1* | 6/2019 | Zhang ............ H04L 5/0057 |
| 2019/0313436 A1 | 10/2019 | Lee et al. |
| 2020/0195318 A1 | 6/2020 | Akkarakaran |
| 2020/0296756 A1 | 9/2020 | Lee et al. |

FOREIGN PATENT DOCUMENTS

WO     2019241929 A1     12/2019

OTHER PUBLICATIONS

International Search Report in the international application No. PCT/IB2020/000483, mailed on Jan. 26, 2021.
Written Opinion of the International Search Authority in the international application No. PCT/IB2020/000483, mailed on Jan. 26, 2021.

* cited by examiner

*Primary Examiner* — Khalid W Shaheed
(74) *Attorney, Agent, or Firm* — Ladas & Parry LLP

(57) ABSTRACT

A method of communication of a user equipment (UE), including: receiving, by the UE, a first information, the first information corresponds to a precoding applied to a transmission; receiving, by the UE, the transmission based on the first information, when the transmission is downlink transmission; or performing, by the UE, the transmission based on the first information, when the transmission is uplink transmission. A UE, a bases station (BS) and a method of communication of a BS are also provided.

17 Claims, 7 Drawing Sheets

SYSTEMS AND METHODS FOR COMMUNICATIONS IN NON-TERRESTRIAL NETWORKS

CROSS-REFERENCE TO RELATED APPLICATION

This application is a continuation of International Application No. PCT/IB2020/000483 filed on Apr. 8, 2020. The entire contents of which are hereby incorporated by reference in its entirety.

BACKGROUND OF THE INVENTION

At present, NTNs are defined as networks, or segments of networks, using an airborne or spaceborne vehicle for transmission.

One example of such NTN is based on spaceborne vehicles such as: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites).

Another NTN example is based on airborne vehicles such as: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

Communication via satellite is an interesting approach owing to its well-known coverage, which can bring the coverage to locations that normally cellular operators are not willing to deploy either due to non-stable number of potential clients, e.g. extremely rural areas, or due to the high deployment cost, e.g. middle of an ocean, a mountain peak.

Nowadays, the satellite communication is a separate technology to 3GPP cellular technology. Coming to 5G era, these two technologies can merge together, i.e. a 5G terminal may be developed to be able to access both cellular and satellite networks. NTN can be a good candidate technology for this purpose. It is to be designed based on 3GPP NR with necessary enhancements.

In 3GPP release IS (Rel-15) support for slot aggregation is present, i.e., data transmission can be scheduled to span one or multiple slots. Slots refer to a structure of a 3GPP NR frames.

In New Radio (NR), a network can configure slot aggregation to enhance the reliability for PDSCH or Physical Downlink Shared Channel (PDSCH) transmission. The slot aggregation is configured via a Radio Resource Control (RRC) signaling. Moreover, the number of repetitions can also be configured, so-called aggregation factor, which has the choices of 2, 4 and 8. Once the aggregation factor is configured, all the PDSCH transmissions will follow this number.

When data is wirelessly transmitted/received using multiple antennas, the UE can receive a correct signal only when the receiver is aware of a channel state between each transmitting antenna and each receiving antenna. Accordingly, a reference signal needs to be provided per transmit antenna, more specifically, per antenna port.

Reference signals can be classified into an uplink reference signal and a downlink reference signal. In new wireless technologies such as LTE, the uplink reference signal includes a demodulation reference signal (DMRS) for channel estimation for coherent demodulation of information transmitted through a PUSCH/PDSCH and a PUCCH/PDCCH.

In NTN, a network may need to enhance reliability for certain services. However, the legacy slot aggregation is lacking flexibility in the way that the different PDSCHs carrying the same transport block (TB) cannot be assumed to share the same precoding, so that the UE cannot process these DMRS jointly, such as joint channel estimation. In other words, the legacy approaches do not impose any specific configuration by allowing DMRS to use any available precoding.

In multi-antenna techniques, precoding is used to map modulation symbols onto different antennas. The type of precoding depends on the multi-antenna technique used as well as on the number of layers and the number of antenna ports. The aim with precoding is to achieve the best possible data reception at the receiver. In particular, the purpose of precoding is to minimize the intra-layer interference, or inter-UE interference or maximize the received signal-noise ratio (SNR).

It would be therefore advantageous to define systems and methods allowing a joint processing of DMRS of different PDSCHs. It would also be beneficial to allow selective operation of such joint processing.

The aim of the development of the present invention are improved systems and methods for the network to inform the UE about the precoding flexibility so that the processing of the demodulation reference signals in the corresponding transmission can be improved in non-terrestrial networks. The transmission includes both downlink and uplink transmissions.

SUMMARY AND OBJECTS OF THE PRESENT INVENTION

The present invention relates to user equipment (UE) systems as well as base station systems, such as the next generation NodeB (gNB), and corresponding methods for the UE to receive a downlink transmission from the base station or to transmit an uplink transmission to the base station in non-terrestrial networks (NTN). In particular, the present invention relates to the indication of precoding that is applied to the downlink transmission to the UE from the base station perspective and precoding determination from the UE perspective.

In a first aspect, the present disclosure provides a method of communication of a user equipment (UE), the method includes: receiving, by the UE, a first information, the first information corresponds to a precoding applied to a transmission; receiving, by the UE, the transmission based on the first information, when the transmission is downlink transmission; or performing, by the UE, the transmission based on the first information, when the transmission is uplink transmission.

In a second aspect, the disclosure provides a user equipment (UE), the UE includes: a transceiver configured to communicate with a non-terrestrial network; a UE processor configured to process a downlink signal reception or uplink signal transmission according to configuration received from a base station: a controller: a shared precoding signaling processor configured to obtain information on whether the same precoding is applied to a group of transmission resources; said controller is configured to process said transmission jointly based on said information.

In a third aspect, the disclosure provides a method of communication of a base station (BS) for transmitting information to a user equipment (UE) about a precoding applied to a transmission in non-terrestrial networks, the method includes the steps of: transmitting an information to the UE, the information corresponds to the precoding that is applied to a transmission; performing, by the BS, the transmission to the UE based on the information when the transmission is downlink; receiving, by the BS, the transmission from the UE based on the information when the transmission is uplink.

In a fourth aspect, the disclosure provides a base station (BS), the BS includes: a transceiver configured to communicate with a non-terrestrial network; a BS processor configured to process a downlink signal reception or uplink signal transmission according to a precoding configuration of the BS, said transmission includes a plurality of transmission resources; a controller; a shared precoding signaling generator configured to generate information on whether the same precoding is applied to a group of transmission resources; said controller is configured to process said transmission jointly based on said information.

BRIEF DESCRIPTION OF THE DRAWINGS

These and other objects of the invention presented herein, are accomplished by providing systems and methods for communication in non-terrestrial networks. Further details and features of the present invention, its nature and various advantages will become more apparent from the following detailed description of the preferred embodiments shown in a drawing, in which.

DESCRIPTION OF EMBODIMENTS

Figure 1:
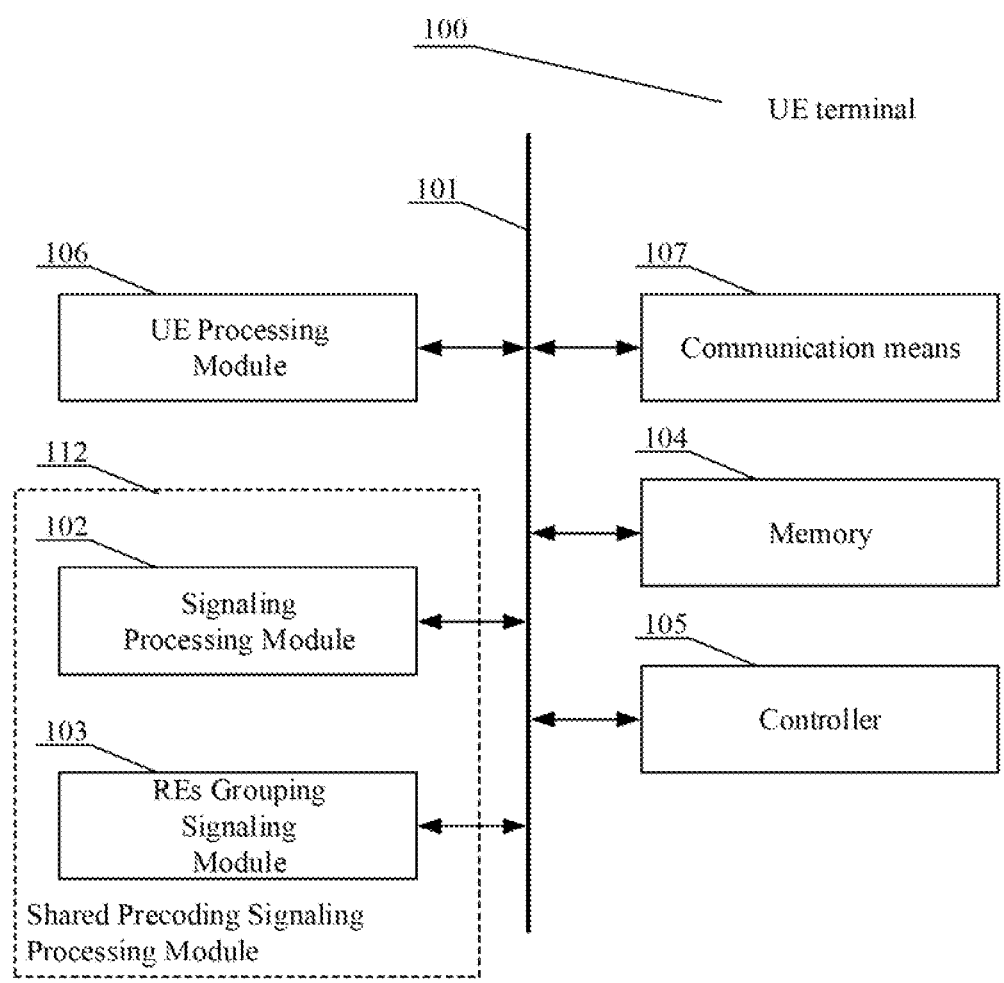
FIG. 1 presents a diagram of a UE system according to the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The present invention is a method, executed by a user equipment UE terminal, for receiving or transmitting a transmission in non-terrestrial networks, the method comprising the steps of: receiving a first information from the base station BS, the information corresponds to the precoding that is applied to a transmission; receiving the transmission based on the information when the transmission is downlink; performing the transmission based on the information when the transmission is uplink.

In some embodiments, the first information is system information, where the system information comprises system information block 1 (SIB1) or SIBx, where x=2, 3, 4 . . . .

In some embodiments, the first information is random access response RAR, which is carried in PDSCH transmitted from the base station to the UE.

In some embodiments, the first information is radio resource control RRC configuration transmitted from the base station to the UE.

In some embodiments, the first information is MAC-CE, which is carried in PDSCH transmitted from the base station to the UE.

In some embodiments, the first information is DCI, which is carried in PDCCH transmitted from the base station to the UE.

In some embodiments, the transmission comprises a first set of resources and a second set of resources, wherein the first set of resources are different from the second set of resources in time domain and/or in frequency domain.

In some embodiments, the first information comprises a first parameter, wherein the first parameter indicates whether the same precoding is applied to the first set of resources and the second set of resources. In some examples, when the first parameter is provided, the UE shall assume the same precoding is applied to the first set of resources and the second set of resources. In some examples, the first parameter with a specific value indicates that the same precoding is applied to the first set of resources and the second set of resources. In some embodiments, when the first parameter is provided, the UE shall assume the same precoding is applied to the first set of resources and the second set of resources, if first set of resources and the second set of resources are in the same slot. In some examples, the first parameter with a specific value indicates that the same precoding is applied to the first set of resources and the second set of resources, if first set of resources and the second set of resources are in the same slot.

In some embodiments, the first information comprises a second parameter, wherein the second parameter indicates that the first set of resources and the second set of resources are in the same resource group. In some examples, when the first parameter is provided, the UE shall assume the same precoding is applied to the first set of resources and the second set of resources, if first set of resources and the second set of resources are in the same resource group. In some examples, when the first parameter is provided with a specific value, the UE shall assume the same precoding is applied to the first set of resources and the second set of resources, if first set of resources and the second set of resources are in the same resource group.

In some embodiments, the UE receives a second information, and the second information comprises the second parameter. In some embodiments, the second information is different from the first information, wherein the second information is at least one of the following: system information, RAR, RRC, MAC-CE, or DCI.

In some embodiments, the first information comprises a third parameter, and the third parameter configures the first set of resources and the second set of resources. In some embodiments, the UE receives a third information, which comprises the third parameter. In some embodiments, the third information is different from the first information, wherein the third information is at least one of the following: system information, RAR, RRC, MAC-CE, or DCI.

In some embodiments, the UE shall apply the same precoding to the first set of the resources and the second set of resources for performing the transmission, when it is indicated that the same precoding is applied to the first set of resources and the second set of resources, and the transmission is uplink.

In some embodiments, the UE may assume the same precoding to the first set of the resources and the second set of resources for reception the transmission, when it is indicated that the same precoding is applied to the first set of resources and the second set of resources, and the transmission is downlink.

In some embodiments, the transmission comprises at least one of the following: physical downlink shared channel (PDSCH) transmission; physical downlink control channel (PDCCH) transmission; physical uplink shared channel (PUSCH) transmission; physical uplink control channel (PUCCH) transmission.

In some embodiments, the transmission comprises a first PDSCH and a second PDSCH, where the first PDSCH and the second PDSCH comprise the same transport block and the same HARQ process number. In some embodiments, the first set of resources are the resources of the first PDSCH and the second set of resources are the resources of the second PDSCH.

In some embodiments, the transmission comprises a first PUSCH and a second PUSCH, where the first PUSCH and the second PUSCH comprise the same transport block and the same HARQ process number. In some embodiments, the first set of resources are the resources of the first PUSCH and the second set of resources are the resources of the second PUSCH.

In some embodiments, the transmission comprises a first PDCCH and a second PDCCH, where the first PDCCH and the second PDCCH comprise the same DCI content. In some embodiments, the first set of resources are the resources of the first PDCCH and the second set of resources are the resources of the second PDCCH.

In some embodiments, the transmission comprises a first PUCCH and a second PUCCH, where the first PUCCH and the second PUCCH comprise the same uplink control indicator UCI content. In some embodiments, the first set of resources are the resources of the first PUCCH and the second set of resources are the resources of the second PUCCH.

In some embodiments, the first parameter comprises at least a pdsch-AggregationFactor, or a pusch-AggregationFactor.

It can be easily recognized, by one skilled in the art, that the aforementioned methods for processing a transmission in a non-terrestrial networks may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

FIG. 1 presents a diagram of a UE system 100 according to the present invention. Depending on the network type, other well-known terms may be used instead of "user equipment" or "UE," such as "mobile station," "subscriber station," "remote terminal," "wireless terminal," or "user device."

The system may be realized using dedicated components or custom made FPGA (Field-Programmable Gate Array) or ASIC (Application-Specific Integrated Circuit) circuits. The system preferably comprises a data bus 101 communicatively coupled to a memory 104. Additionally, other components of the UE 100 system are communicatively coupled to the system bus 101 so that they may be managed by a controller 105.

Figure 3:
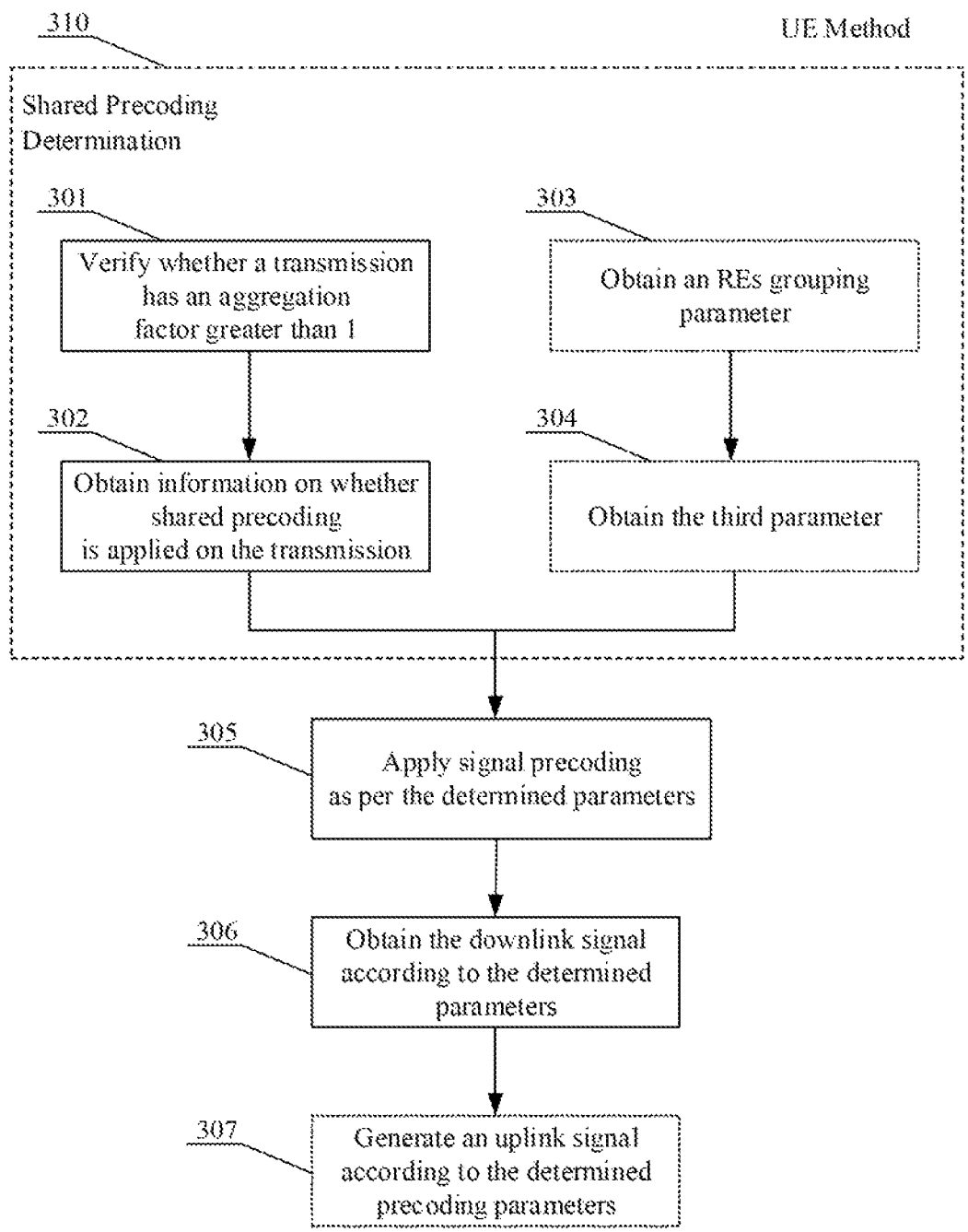
FIG. 3 presents a diagram of the method executed by a UE according to the present disclosure.

The memory 104 may store computer program or programs executed by the controller 105 in order to execute steps of the method according to the present disclosure (FIG. 3).

The system comprises communication means 107 allowing for the selected communication such as NTN. The communication means 107 typically comprises a transceiver and antenna (such as a MIMO antenna system) not shown in the drawing as these are common components recognized by a person skilled in the art.

A UE Processing Module 106 is configured to process a downlink signal reception or uplink signal transmission according to signaling provided by a Signaling Processing Module 102 and/or by a REs (Resource Elements or resources in general) Grouping Signaling Module 103.

In addition, although the present invention is described in relation to a preferred embodiment and application to DMRS, it will be clear to a person skilled in the art that the present invention may be applied to other Reference Signals using precoding or in general to signals using precoding.

The UE Processing Module 106 may be configured to process a downlink signal reception or uplink signal transmission according to configuration received from a base station. In particular, the signal may be a PDSCHs DMRS and the configuration may relate to processing the signal separately or jointly i.e. by applying the same precoding when processing.

It is to be noted that the Signaling Processing Module 102 and the REs Grouping Signaling Module 103 are jointly called a Shared Precoding Signaling Processing Module 112. To this end, typically either the Signaling Processing Module 102 or the REs Grouping Signaling Module 103 will be present in the system, however a UE 100 may also comprise both modules as they are intended to detect different signaling.

The Signaling Processing Module 102 is configured to obtain, from the corresponding base station 200, information on whether shared precoding is applied on the signals while the transmission has an aggregation factor greater than 1 according to for example a pdsch-AggregationFactor, or a pusch-AggregationFactor (also referred to as the first parameter).

The REs Grouping Signaling Module 103 is configured to obtain, from the corresponding base station 200, information (also referred to as the second parameter) that indicates that at least the first set of resources and the second set of resources are in the same group, where the same precoding is applied to this resource group.

Owing to the same precoding being applied to a first set of resources and a second set of resources of a signal as well as owing to the REs grouping, a flexible approach to processing of signals using precoding may be obtained, which results in quicker data processing.

Figure 2:
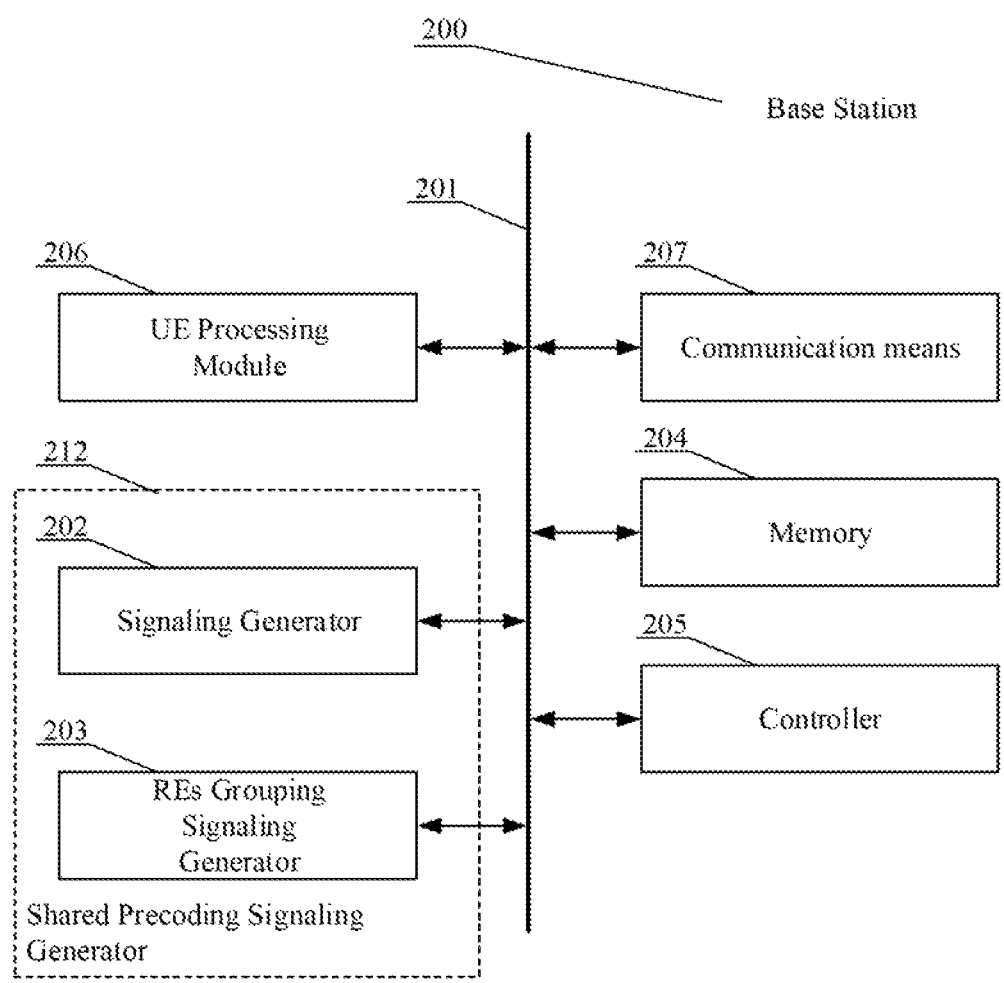
FIG. 2 presents a diagram of the base station system according to the present disclosure.

FIG. 2 presents a diagram of the base station system 200 i.e. a base station according to the present disclosure. Depending on the network type, the term "base station" or "BS" can refer to any component (or collection of components) configured to provide wireless access to a network, such as transmit point TP, transmit-receive point TRP, an enhanced base station (eNodeB or eNB), gNB, a macrocell, a femtocell, a WiFi access point AP, or other wirelessly enabled devices.

Base stations may provide wireless access in accordance with one or more wireless communication protocols, e.g., 5G 3GPP New Radio Interface/Access NR.

The system may be realized using dedicated components or custom made FPGA or ASIC circuits. The system preferably comprises a data bus 201 communicatively coupled to a memory 204. Additionally, other components of the system are communicatively coupled to the system bus 201 so that they may be managed by a controller 205.

Figure 4:
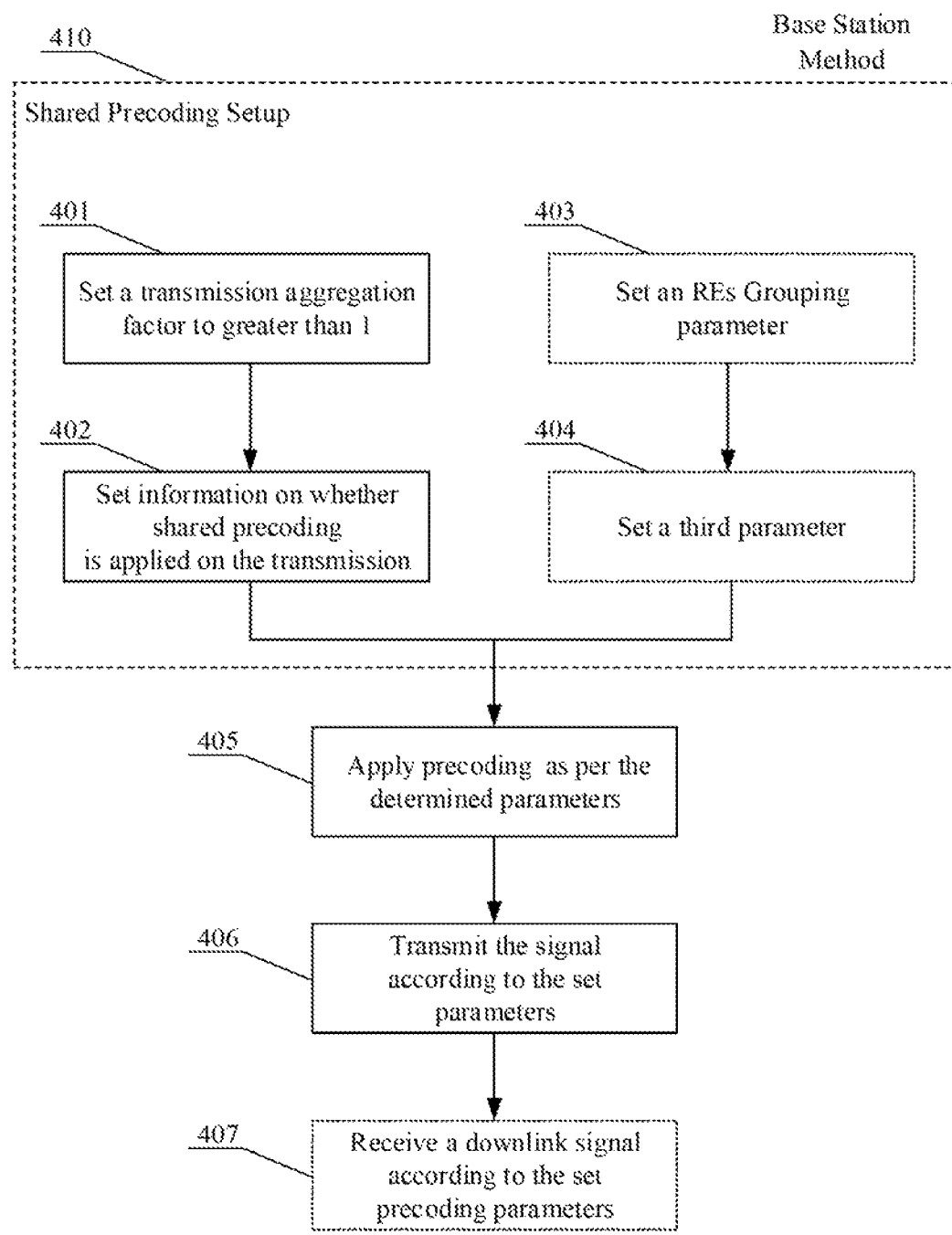
FIG. 4 presents a diagram of the method executed by a base station according to the present disclosure.

The memory 204 may store computer program or programs executed by the controller 205 in order to execute steps of the method according to the present disclosure (FIG. 4).

The system comprises communication means 207 allowing for the selected communication such as NTN. The communication means 207 typically comprises a transceiver and antenna (such as a MIMO antenna system) not shown in the drawing as these are common components recognized by a person skilled in the art.

A BS Processing Module 206 is configured to process transmission signals (using precoding) according to chosen signaling provided by a Signaling Generator 202 and/or by a REs (Resource Elements or resources in general) Grouping Signaling Generator 203.

It is to be noted that the Signaling Generator 202 and the REs Grouping Signaling Generator 203 are jointly called a Shared Precoding Signaling Generator 212. To this end, either Signaling Generator 202 or the REs Grouping Signaling Generator 203 will be typically present, however a base station 200 may also comprise both modules as they are intended to generate different signaling.

The BS Processing Module 206 may, according to its configuration, process the resource elements in the transmitted signal using precoding applied separately or jointly i.e. by applying the same precoding.

As explained with reference to FIG. 1 the Signaling Generator 202 is configured to generate information on whether shared precoding is applied on the signals while the transmission has an aggregation factor greater than 1 according to for example a pdsch-AggregationFactor, or a pusch-AggregationFactor. The configuration of precoding may depend on current needs and configuration of the base station 200 system.

The REs Grouping Signaling Generator 203 is configured to generate information that indicates that at least the first set of resources and the second set of resources are in the same group, where the same precoding is applied to this resource group.

In an embodiment, the REs Grouping Signaling may be present in the transmitted signal irrespective of the presence of the shared precoding indication. This is because, shared precoding may be inferred (implicitly) from the REs Grouping Signaling. Therefore, such embodiment is also envisaged.

In yet another embodiment, REs Grouping Signaling may be present in the signal together with the presence of the shared precoding signaling. In such case, the system may select one of the methods as having higher priority e.g. by default the shared precoding is applied even though REs Grouping Signaling is present.

FIG. 3 presents a diagram of the method executed by a UE 100 according to the present invention. The method applies to a communication signal received from a base station 200 and comprising a downlink transmission signals, that are using precoding, as well as relevant configuration messages.

A first general step of the method 310 is a shared precoding determination, which may be effected by two paths. Path A comprising steps 301-302 and/or path B comprising steps 303-304.

The method of path A starts at step 301 from verifying whether a downlink transmission has an aggregation factor greater than 1. This is executed for example based on typical 3GPP signal from a base station 200.

Subsequently, at step 302 the UE obtains information on whether shared precoding is applied on the transmission signal as generated by the Signaling Generator 202 by using the information on shared precoding.

The method of path B starts at step 303 where the UE 100 obtains an REs Grouping parameter and at step 304 optionally obtains a third parameter configuring the sets of resources of a group. These parameters are generated by the corresponding REs Grouping Signaling Generator 203.

At step 305 the method proceeds to applying signal precoding as per the determined parameters and lastly, at step 306, the UE 100 obtains the signals according to the determined parameters.

Optionally, lastly the UE 100 may apply the same precoding parameters on signals it generates and transmits back 307 to the bases station 200 (i.e. UEs uplink transmission).

FIG. 4 presents a diagram of the method executed by a base station 200 according to the present disclosure.

A first general step of the method 410 is a Shared Precoding setup, which may be effected by two paths. Path A comprising steps 401-402 and/or path B comprising steps 403-404.

The method according to path A starts at step 401 from setting a transmission aggregation factor as greater than 1. This is executed for example based on typical 3GPP signal generation by a base station 200.

Subsequently, at step 402 the base station 200 sets information on whether shared precoding is to be applied on the signal as generated by the Signaling Generator 202 by using the shared precoding information.

The method according to path B starts, at step 403, where the base station 200 sets an REs Grouping parameter and at step 404 optionally sets a third parameter configuring the sets of resources of a group. These parameters are generated by the corresponding REs Grouping Signaling Generator 203.

At step 405 the method proceeds to applying precoding (by the BS Processing Module 206) as per the determined parameters and, at step 406, the base station 200 transmits the generated signals according to the determined precoding parameters. Optionally, lastly the BS 200 may apply 407 the same precoding parameters on signals it receives back from the respective UE 100 (i.e. BSs downlink transmission).

Figure 5A:
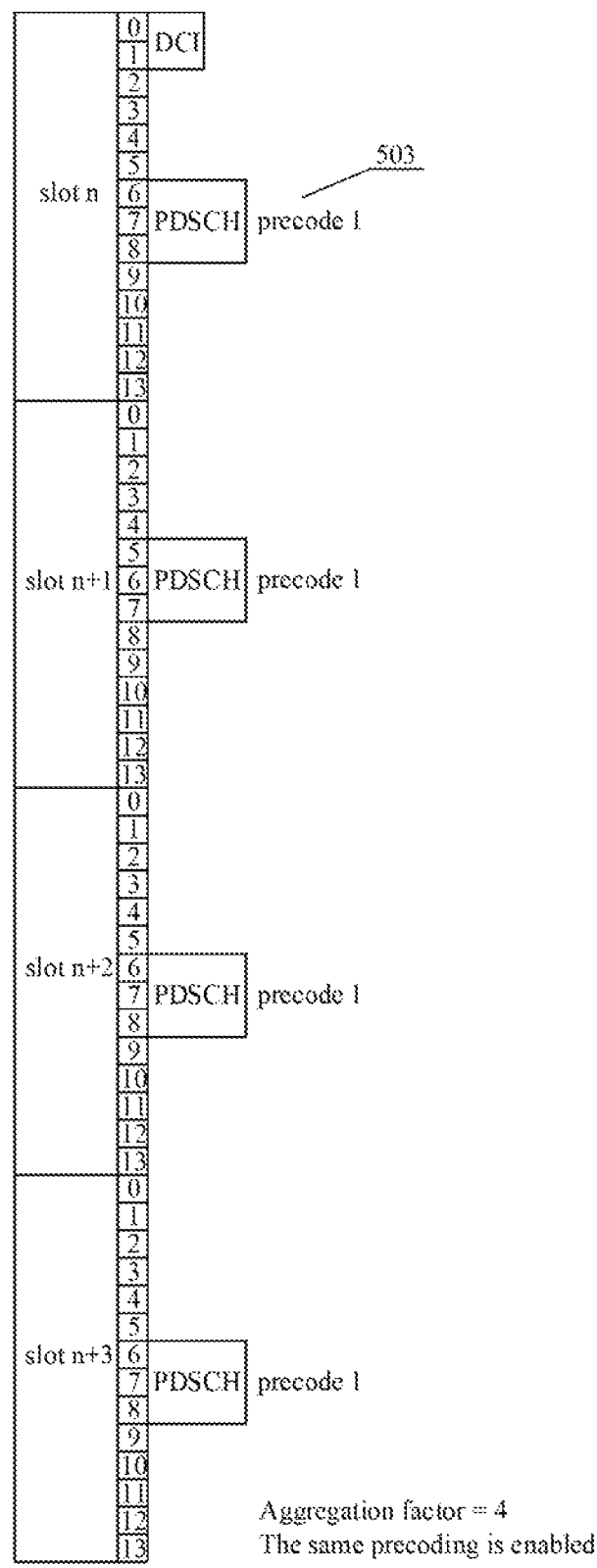
FIGS. 5A-5C present examples of the DMRS signal processing according to the present disclosure.
Figure 5B:
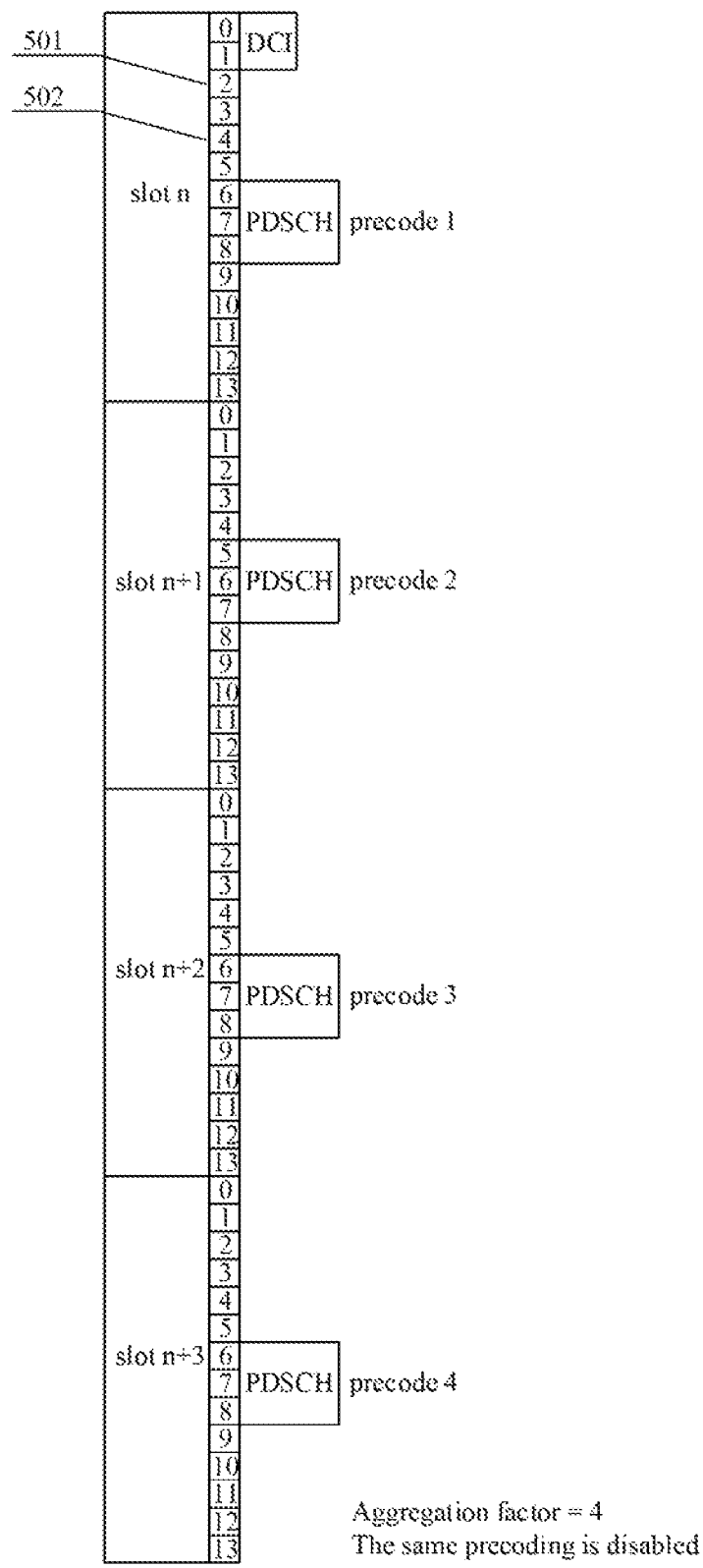
Figure 5C:
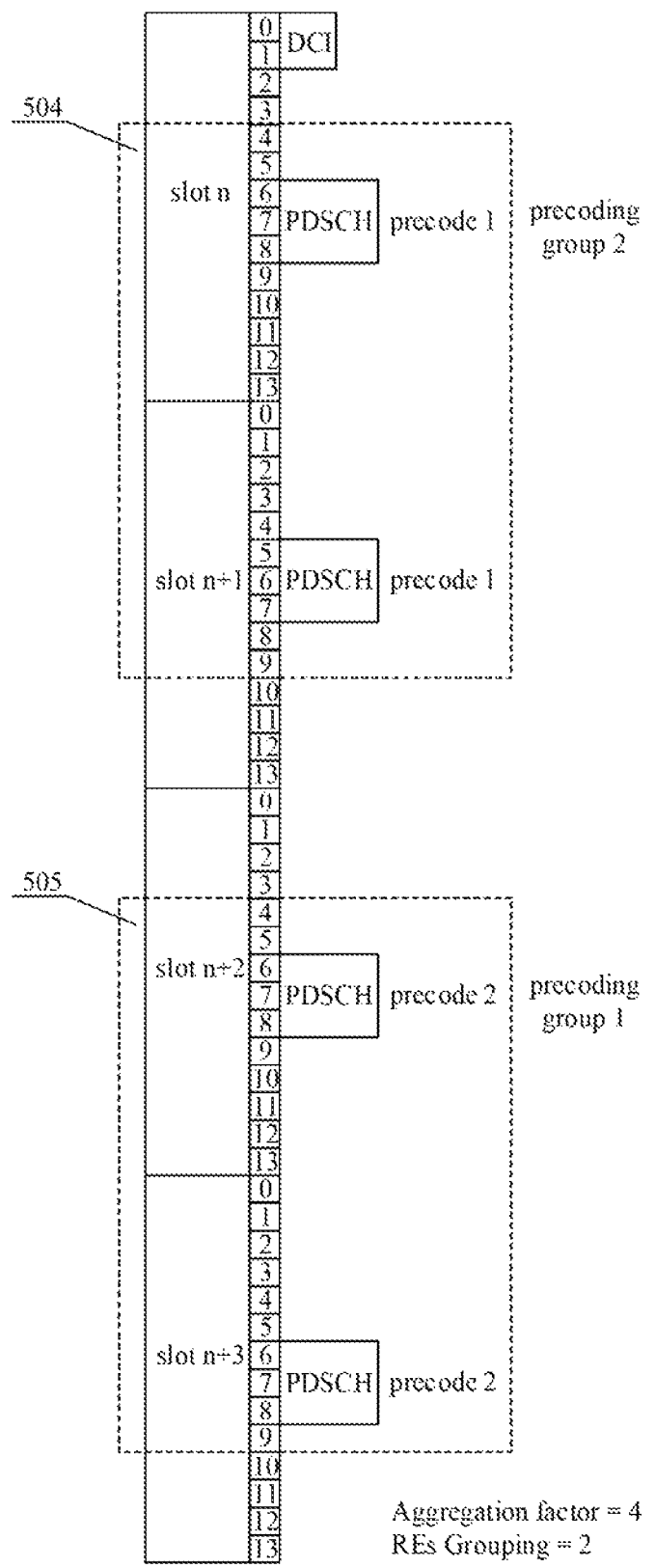

FIGS. 5A to 5C present examples of the PDSCH processing using the method according to the present invention. In these examples four slots 501 are presented: slot n to slot n+3. Typically such slots comprise symbols 502 in accordance with slot configuration, in this case each symbol comprises 14 slots: 0 to 13.

EXAMPLES

As shown in FIGS. 5A to 5B, a transmission comprises more than one PDSCH transmission. The PDSCH in slot n is denoted as the first PDSCH and the PDSCH in slot n+1 as the second PDSCH. The resources of the first PDSCH are the first set of resources, and the resources of the second PDSCH are the second set of resources.

The UE can receive a first information, which comprises a first parameter. The first parameter indicates whether the same precoding is applied to the first set of resources and the second set of resources. One example is that the first parameter is a pdsch-AggregationFactor, when the first parameter is provided, the UE assumes that the same precoding is applied to the first set of resources and the second set of resources, which is equivalent to indicating that the same precoding is applied to the first PDSCH and the second PDSCH.

In another example, the first parameter has more than one value, a specific value indicates the same precoding is applied to the first set of resources and the second set of resources, e.g. when the first parameter assumes one of two values which typically means that the first parameter has binary values such as 'on/off', then '1', representing 'on', is used to indicate the same precoding is applied to the first set of resources and the second set of resources, and '0', representing 'off', is used to indicate different precoding are applied to the first set of resources and the second set of resources, respectively. It is naturally understood that the value '0' can also be used to represent 'on' and the value '1' can also be used to represent 'off'.

In another example, if the first parameter has more than 2 values, e.g. a pdsch-AggregationFactor has (2, 4, 8), when the first parameter is configured with a specific value, e.g. {4}, the UE assumes that the same precoding is applied to the first set of resources and the second set of resources; otherwise, the UE assumes that different precoding is applied to the first set of resources and the second set of resources, respectively.

In some examples, a further condition is imposed, i.e. the same precoding is applied to the first set of resources and the second set of resources, if the first set of resources and the second set of resources are in the same slot. In FIGS. 5A to 5B, obviously the first PDSCH and the second PDSCH do not satisfy this condition, unless we shift the second PDSCH to the slot n.

In some examples, the first PDSCH and the second PDSCH correspond to the same transport block of the same HARQ process number. In this case the transmission is PDSCH slot aggregation.

The first parameter may be included in system information or RRC or MAC-CE, thus the precoding configuration remains for a relatively long term. Alternatively, the first parameter may also be included in RAR or DCI, where the first parameter corresponds to an indication field which indicates the 'on/off' status. Optionally, the first parameter can be split in RRC, system information and MAC-CE and DCI/RAR. e.g. in RRC the first parameters are configured with one or more values, then in DCI a dedicated indication field further indicates the target value of the first parameter.

In some examples, a second parameter is used to configure resource groups. The second parameter may configure the first PDSCH and the second PDSCH in the same resource group or in different resource groups. Then further, the first parameter indicates if the same precoding is applied to the resource group. In this example, when the same precoding is applied, it applies only to the resources in the same resource group. Thus, the UE cannot assume that the same precoding is applied to the resources in different resource groups.

As shown in FIG. 5C, the first PDSCH and the second PDSCH are configured by the second parameter to the same resource group. One example is that the second parameter configures the number of the PDSCH in a resource group, then UE splits the total number of PDSCH in the transmission into different groups, e.g. in FIG. 5C, the second parameter configures that two PDSCHs in one resource group, since the transmission contains four PDSCHs, the first two PDSCHs are in a group, and the last two PDSCHs in the other group.

In some examples, a third parameter is used to configure the first PDSCH resources and the second PDSCH resources. The resources include time resources and/or frequency domain resources. In some examples, the third parameter configures only one PDSCH resources, e.g. either the first PDSCH or the second PDSCH, and the resources of the other PDSCH are determined by a pre-defined relationship. In some examples, the third parameter configures the first and the second PDSCH resources, respectively.

In some examples, the first parameter and/or the second parameter and/or the third parameter are received in the same information. Alternatively, the first parameter and/or the second parameter and/or the third parameter are received in different information.

In some examples, the terms "module" and the like in the UE system as shown in FIG. 1 and in the base station system as shown in FIG. 2 may be implemented by one or more hardware circuits/sub-circuits and/or one or more processors. In some examples, a module may include one or more circuits with or without stored code or instructions. The module may include one or more components that are directly or indirectly connected. These components may or may not be physically attached to, or located adjacent to, one another.

ADDITIONAL EMBODIMENTS

A first object of the present invention is a user equipment UE terminal that receives information from a base station BS (e.g. gNB) about precoding indication. The UE may use adequate processing assumption for transmission reception, which includes processing demodulation reference signals DMRS; or the UE can use the indicated precoding request to prepare the uplink transmission, which includes DMRS preparation.

The UE comprises: a communication means configured to communicate with said non-terrestrial networks; a Processing Module configured to process a downlink signal reception or uplink signal transmission, including but not limited to DMRS processing, according to configuration received from a base station; a controller, the UE further comprising: a Shared Precoding Signaling Processing Module configured to obtain information on whether the same precoding is applied to a group of transmission resources; wherein said controller is configured to process said transmission jointly based on said information.

Optionally, the Shared Precoding Signaling Processing Module comprises a Signaling Processing Module configured to obtain, from the received signal of the base station, information on whether the same precoding is applied to a first set of resources and a second set of resources, where the first set of resources and the second set of resources belong to the resources of said transmission. Moreover the first set of resources is different from the second set of resources in time domain and/or in frequency domain.

Optionally, the said transmission comprises at least a first PDSCH transmissions and a second PDSCH transmission. The first PDSCH and the second PDSCH correspond to the same transport block of the same hybrid automatic repeat request (HARQ) process number.

Optionally, the first PDSCH and the second PDSCH are in the same slot.

Optionally, said information on whether the same precoding is applied to said transmission is received in system information or random access response (RAR) or radio resource control (RRC) or medium access control-control element (MAC-CE) or downlink control indicator (DCI).

Optionally, said information on whether the same precoding is applied to said transmission comprises a first parameter and the first parameter indicates whether the same precoding is applied to the first set of resources and the second set of resources.

Optionally, said information on whether the same precoding is applied to said transmission comprises a second parameter and the second parameter indicates whether the first set of resources and the second set of resources are in the same resource group, and the same precoding is applied to the resource group.

Optionally, said information on whether the same precoding is applied to said transmission comprises a third parameter and the third parameter is used to configure the first set of resources and the second set of resources.

A second object of the present invention is a method, executed by a user equipment UE terminal, for receiving or transmitting a transmission in non-terrestrial networks, the method comprising the steps of: receiving an information from the base station, the information corresponds to the precoding that is applied to a transmission; receiving the transmission based on the information when the transmission is downlink; performing the transmission based on the information when the transmission is uplink.

Optionally, the information is at least one of the following: system information, RAR, RRC, MAC-CE, DCI, Configuration information element (IE) for PDSCH PDSCH-Config, Configuration IE for PDCCH PDCCH-Config, Configuration IE for PUSCH PUSCH-Config, Configuration IE for PUCCH PUCCH-Config.

Optionally, the transmission comprises a first set of resources and a second set of resources, wherein the first and the second set of resources are different in time domain and/or frequency domain.

Optionally, the information comprises a first parameter, and the first parameter indicates whether the same or different precoding is applied to the first set of resources and the second set of resources.

Optionally, the information comprises a first parameter, and the first parameter indicates that the same precoding is applied to the first set of resources and the second set of resources when the first and the second set of resources are in a same slot.

Optionally, the information comprises a second parameter, and the second parameter indicates the first set of resources and the second set of resources are in a resource group and the same precoding is applied to the same resources group.

Optionally, the information comprises a third parameter, the third parameter is used to configure the first set of resources and the second set of resources.

Optionally, the method wherein receiving, by the UE, the transmission based on the information when the transmission is downlink comprises: assuming by the UE the same precoding applied to the first set of resources and the second set of resources, when the precoding applied to the first set of resources is indicated to be the same as the precoding applied to the second set of resources by the first parameter and/or the second parameter. Optionally, according to the method the UE may jointly process the DMRS from the first and the second set of resources.

Optionally, the method wherein performing, by the UE, the transmission based on the information when the transmission is uplink comprises: applying by the UE the same precoding applied to the first set of resources and the second set of resources, when the precoding applied to the first set of resources is indicated to be the same as the precoding applied to the second set of resources by the first parameter and/or the second parameter. Optionally, according to the method the UE shall use the same precoding for the DMRS in the first and the second set of resources.

Optionally, the transmission comprises at least one of the following: PDSCH, PDCCH, PUSCH, PUCCH.

Optionally, the transmission comprises a first PDSCH and a second PDSCH, where the first PDSCH and the second PDSCH comprise the same transport block and the same HARQ process number. Moreover, the first set of resources comprises the resources of the first PDSCH and the second set of resources comprises the resources of the second PDSCH.

Optionally, the transmission comprises a first PUSCH and a second PUSCH, where the first PUSCH and the second PUSCH comprise the same transport block and the same HARQ process number. Moreover, the first set of resources comprises the resources of the first PUSCH and the second set of resources comprises the resources of the second PUSCH.

Optionally, the transmission comprises a first PDCCH and a second PDCCH, where the first PDCCH and the second PDCCH comprise the same DCI content.

Moreover, the first set of resources comprises the resources of the first PDCCH and the second set of resources comprises the resources of the second PDCCH.

Optionally, the transmission comprises a first PUCCH and a second PUCCH, where the first PUCCH and the second PUCCH comprise the same uplink control indicator UCI content. Moreover, the first set of resources comprises the resources of the first PUCCH and the second set of resources comprises the resources of the second PUCCH.

Optionally, the first parameter comprises at least the pdsch-AggregationFactor, or pusch-AggregationFactor.

A third object of the present invention is a computer program comprising program code means for performing all the steps of the computer-implemented method according to the second object of the present invention when said program is run on a computer.

A fourth object of the present invention is a computer readable medium storing computer-executable instructions performing all the steps of the computer-implemented method according to the second object of the present invention when executed on a computer.

A fifth object of the present invention is a method executed by a base station BS for sending an information to a UE about a precoding applied to a transmission in non-terrestrial networks, and the method comprises: transmitting an information to the UE, the information corresponding to the precoding that is applied to the transmission; performing, by the base station BS, the transmission to the UE based on the information when the transmission is downlink; receiving, by the base station BS, the transmission from the UE based on the information when the transmission is uplink.

Optionally, the information is at least one of the following: system information, RAR, RRC, MAC-CE, DCI, Configuration information element (IE) for PDSCH PDSCH-Config, Configuration IE for PDCCH PDCCH-Config, Configuration IE for PUSCH PUSCH-Config, Configuration IE for PUCCH PUCCH-Config.

Optionally, the transmission comprises a first set of resources and a second set of resources, wherein the first and the second set of resources are different in time domain and/or frequency domain.

Optionally, the information comprises a first parameter, and the first parameter indicates whether the same precoding is applied to the first set of resources and the second set of resources.

Optionally, the information comprises a first parameter, and the first parameter indicates that the same precoding is applied to the first set of resources and the second set of resources when the first and the second set of resources are in a same slot.

Optionally, the information comprises a second parameter, and the second parameter indicates the first set of resources and the second set of resources are in a resource group and the same precoding is applied to the same resource group.

Optionally, the information comprises a third parameter, the third parameter is used to configure the first set of resources and the second set of resources.

Optionally, the method wherein receiving, by the base station, the transmission based on the information when the transmission is uplink comprises: assuming by the base station the same precoding applied to the first set of resources and the second set of resources, when the precoding applied to the first set of resources is indicated to be the same as the precoding applied to the second set of resources by the first parameter and/or the second parameter. Optionally, the method further comprises the base station assuming that the UE shall apply the same precoding to the DMRS in the first and the second set of resources.

Optionally, the method wherein performing, by the base station, the transmission based on the information when the transmission is downlink comprises: applying by the base station the same precoding to the first set of resources and the second set of resources, when the precoding applied to the first set of resources is indicated to be the same as the precoding applied to the second set of resources by the first parameter and/or the second parameter. Optionally, the method further comprises the base station applying the same precoding for the DMRS in the first and the second set of resources.

Optionally, the transmission comprises at least one of the following: PDSCH, PDCCH, PUSCH, PUCCH.

Optionally, the transmission comprises a first PDSCH and a second PDSCH, where the first PDSCH and the second PDSCH comprise the same transport block and the same HARQ process number. Moreover, the first set of resources comprises the resources of the first PDSCH and the second set of resources comprises the resources of the second PDSCH.

Optionally, the transmission comprises a first PUSCH and a second PUSCH, where the first PUSCH and the second PUSCH comprise the same transport block and the same HARQ process number. Moreover, the first set of resources comprises the resources of the first PUSCH and the second set of resources comprises the resources of the second PUSCH.

Optionally, the transmission comprises a first PDCCH and a second PDCCH, where the first PDCCH and the second PDCCH comprise the same DCI content. Moreover, the first set of resources comprises the resources of the first PDCCH and the second set of resources comprises the resources of the second PDCCH.

Optionally, the transmission comprises a first PUCCH and a second PUCCH, where the first PUCCH and the second PUCCH comprise the same uplink control indicator UCI content. Moreover, the first set of resources comprises the resources of the first PUCCH and the second set of resources comprises the resources of the second PUCCH.

Optionally, the first parameter comprises at least a pdsch-AggregationFactor, or a pusch-AggregationFactor.

A sixth object of the present invention is a computer program comprising program code means for performing all the steps of the computer-implemented method according to the fifth object of the present invention when said program is run on a computer.

A seventh object of the present invention is a computer readable medium storing computer-executable instructions performing all the steps of the computer-implemented method according to the fifth object of the present invention when executed on a computer.

An eighth object of the present disclosure is a base station BS, the BS comprising: a communication means configured to communicate with a non-terrestrial network; a signal processing module configured to process a downlink signal reception or uplink signal transmission according to a precoding configuration of the BS wherein said transmission comprises a plurality of transmission resources; a controller: a shared precoding signaling generator configured to generate information on whether the same precoding is applied to a group of transmission resources; wherein said controller is configured to process said transmission jointly based on said information.

In an embodiment of BS, the shared precoding signaling generator comprises a signaling generating module configured to generate information on whether the same precoding is applied to a first set of resources and a second set of resources, where the first set of resources and the second set of resources belong to the resources of the said transmission.

In an embodiment of BS, the first set of resources are different from the second set of resources in time domain and/or in frequency domain.

In an embodiment of BS, said transmission comprises at least a first PDSCH transmissions and a second PDSCH transmission where the first PDSCH and the second PDSCH correspond to the same transport block of the same HARQ process number.

In an embodiment of BS, the first PDSCH and the second PDSCH are in a same slot.

In an embodiment of BS, said information on whether the same precoding is applied to said transmission is transmitted in system information or random access response, RAR, or radio resource control, RRC, or medium access control-control element, MAC-CE or downlink control indicator, DCI.

In an embodiment of BS, said information on whether the same precoding is applied to the said transmission comprises a first parameter and the first parameter indicates whether the same precoding is applied to the first set of resources and the second set of resources.

In an embodiment of BS, said information on whether the same precoding is applied to said transmission comprises a second parameter and the second parameter indicates whether the first set of resources and the second set of resources are in the same resource group, and the same precoding is applied to the resource group.

In an embodiment of BS, said information on whether the same precoding is applied to said transmission comprises a third parameter and the third parameter is used to configure the first set of resources and the second set of resources.

It will be evident to a person skilled in the art that the various embodiments of the invention mentioned in this description can be combined with one another, unless stated otherwise.

The invention claimed is:

1. A method of communication of a user equipment (UE), the method comprising:
  receiving, by the UE, a first information, wherein the first information corresponds to a precoding applied to a transmission in non-terrestrial networks;

receiving, by the UE, the transmission based on the first information, when the transmission is downlink transmission; or performing, by the UE, the transmission based on the first information, when the transmission is uplink transmission, wherein the transmission comprises a first set of resources and a second set of resources, wherein receiving, by the UE, the transmission based on the first information comprises:

the UE shall assume the same precoding applied to the first set of resources and the second set of resources, when the precoding applied to the first set of resources is indicated to be the same as the precoding applied to the second set of resources by at least one of a first parameter or a second parameter; or performing by the UE, the transmission based on the first information comprises:

the UE shall apply the same precoding to the first set of resources and the second set of resources, when the precoding applied to the first set of resources is indicated to be the same as the precoding applied to the second set of resources by at least one of a first parameter or a second parameter, and wherein the first parameter comprises at least a pdsch-AggregationFactor, or a pusch-AggregationFactor.

2. The method according to claim 1, wherein the first information comprises the first parameter, and the first parameter corresponds to the precoding applied to the transmission.

3. The method according to claim 2, wherein the first set of resources are different from the second set of resources in at least one of time domain or frequency domain.

4. The method according to claim 3, wherein the first parameter corresponds to the precoding applied to the first set of resources and to the second set of resources.

5. The method according to claim 4, wherein the first parameter indicates that the precoding applied to the first set of resources is the same as the precoding applied to the second set of resources; or the first parameter indicates that the precoding applied to the first set of resources is different from the precoding applied to the second set of resources; or the first parameter indicates that the precoding applied to the first set of resources is the same as the precoding applied to the second set of resources, when the first set of resources and the second set of resources are in the same slot.

6. The method according to claim 3, wherein the first information further comprises the second parameter, and the second parameter corresponds to the precoding applied to the first set of resources and to the second set of resources, and wherein the second parameter indicates that the first set of resources and the second set of resources are in the same group, where the same precoding is applied to this resources group.

7. The method according to claim 3, wherein the transmission comprises at least one of the following:

physical downlink shared channel (PDSCH) transmission;

physical downlink control channel (PDCCH) transmission;

physical uplink shared channel (PUSCH) transmission; or physical uplink control channel (PUCCH) transmission, when the transmission comprises a first PDSCH transmission and a second PDSCH transmission, the first PDSCH and the second PDSCH comprise the same transport block and the same HARQ process number, and the first set of resources comprises the resources of the first PDSCH and the second set of resources comprises the resources of the second PDSCH, when the transmission comprises a first PUSCH transmission and a second PUSCH transmission, the first PUSCH and the second PUSCH comprise the same transport block and the same HARQ process number, and the first set of resources comprises the resources of the first PUSCH and the second set of resources comprises the resources of the second PUSCH, when the transmission comprises a first PDCCH transmission and a second PDCCH transmission, the first PDCCH and the second PDCCH comprise the same DCI content, and the first set of resources comprises the resources of the first PDCCH and the second set of resources comprises the resources of the second PDCCH, and when the transmission comprises a first PUCCH transmission and a second PUCCH transmission, the first PUCCH and the second PUCCH comprise the same uplink control indicator, UCI, content; and the first set of resources comprises the resources of the first PUCCH and the second set of resources comprises the resources of the second PUCCH.

8. The method according to claim 3, wherein the first information further comprises a third parameter, and the third parameter is used to configure the first set of resources and the second set of resources.

9. A user equipment (UE), the UE comprising:

a transceiver configured to receive first information, wherein the first information corresponds to a precoding applied to a transmission in non-terrestrial networks;

a UE processor configured to receive the transmission based on the first information when the transmission is downlink transmission, or perform the transmission based on the first information when the transmission is uplink transmission, wherein the transmission comprises a first set of resources and a second set of resources, wherein in a case that the UE processor receives the downlink transmission, the UE shall assume the same precoding applied to the first set of resources and the second set of resources when the precoding applied to the first set of resources is indicated to be the same as the precoding applied to the second set of resources by at least one of a first parameter or a second parameter; or in a case that the UE processor performs the uplink transmission, the UE shall apply the same precoding to the first set of resources and the second set of resources when the precoding applied to the first set of resources is indicated to be the same as the precoding applied to the second set of resources by at least one of a first parameter or a second parameter, and wherein the first parameter comprises at least a pdsch-AggregationFactor or a pusch-AggregationFactor.

10. The UE according to claim 9, wherein the shared precoding signaling processor comprises a signaling processor configured to obtain, from a received signal of the base station, the first information on whether the same precoding is applied to the first set of resources and the second set of resources.

11. The UE according to claim 9, wherein said first information on whether the same precoding is applied to the said transmission is received in system information, random access response (RAR), radio resource control (RRC), medium access control-control element (MAC-CE) or downlink control indicator (DCI).

12. The UE according to claim 9, wherein
said first information on whether the same precoding is applied to the said transmission comprises the first parameter and the first parameter indicates whether the same precoding is applied to the first set of resources and the second set of resources, or
said first information on whether the same precoding is applied to the said transmission comprises the second parameter and the second parameter indicates whether the first set of resources and the second set of resources are in the same resource group, and the same precoding is applied to the resource group, or
said first information on whether the same precoding is applied to the said transmission comprises a third parameter and the third parameter is used to configure the first set of resources and the second set of resources.

13. A method of communication of a base station (BS) for transmitting information to a user equipment (UE) about a precoding applied to a transmission in non-terrestrial networks, the method comprising the steps of:
transmitting an information to the UE, wherein the information corresponds to the precoding that is applied to a transmission;
performing, by the BS, the transmission to the UE based on the information when the transmission is downlink;
receiving, by the BS, the transmission from the UE based on the information when the transmission is uplink,
wherein the transmission comprises a first set of resources and a second set of resources,
wherein receiving, by the BS, the transmission from the UE based on the information when the transmission is uplink comprises: the BS shall assume the same precoding applied to the first set of resources and the second set of resources, when the precoding applied to the first set of resources is indicated to be the same as the precoding applied to the second set of resources by at least one of a first parameter or a second parameter; or performing, by the BS, the transmission to the UE based on the information when the transmission is downlink comprises: the BS shall assume the same precoding applied to the first set of resources and the second set of resources, when the precoding applied to the first set of resources is indicated to be the same as the precoding applied to the second set of resources by at least one of a first parameter or a second parameter;
and wherein the first parameter comprises at least a pdsch-AggregationFactor, or a pusch-AggregationFactor.

14. The method according to claim 13, wherein the information further comprises at least one of the following:
configuration information element (IE) for physical downlink shared channel (PDSCH), PDSCH-Config,
configuration IE for physical downlink control channel (PDCCH), PDCCH-Config,
configuration IE for physical uplink shared channel (PUSCH), PUSCH-Config, or
configuration IE for physical uplink control channel (PUCCH), PUCCH-Config.

15. A base station (BS), the BS comprising:
a transceiver configured to transmit information to a user equipment (UE) about a precoding applied to a transmission in non-terrestrial networks;
a BS processor configured to perform the transmission to the UE based on the information when the transmission is downlink, or receive the transmission from the UE based on the information when the transmission is uplink;
wherein the transmission comprises a first set of resources and a second set of resources;
wherein in a case that the BS processor receives the uplink transmission, the BS shall assume the same precoding applied to the first set of resources and the second set of resources when the precoding applied to the first set of resources is indicated to be the same as the precoding applied to the second set of resources by at least one of a first parameter or a second parameter; or
in a case that the BS processor performs the downlink transmission, the BS shall assume the same precoding applied to the first set of resources and the second set of resources when the precoding applied to the first set of resources is indicated to be the same as the precoding applied to the second set of resources by at least one of a first parameter or a second parameter;
and wherein the first parameter comprises at least a pdsch-AggregationFactor or a pusch-AggregationFactor.

16. The BS according to claim 15, wherein the shared precoding signaling generator comprises a signaling generator configured to generate the information on whether the same precoding is applied to the first set of resources and the second set of resources.

17. The BS according to claim 15, wherein the first physical downlink shared channel (PDSCH) and the second PDSCH are in a same slot.

* * * * *